(12) United States Patent
Dienhart et al.

(10) Patent No.: US 10,981,434 B2
(45) Date of Patent: Apr. 20, 2021

(54) VEHICLE AIR-CONDITIONING SYSTEM AND METHOD OF OPERATION

(71) Applicant: FORD GLOBAL TECHNOLOGIES, LLC, Dearborn, MI (US)

(72) Inventors: Bernd Dienhart, Cologne (DE); Sandra Krolewski, Neuss (DE); Dietmar Fischer, Cologne (DE); Klaus Schuermanns, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 775 days.

(21) Appl. No.: 15/729,223

(22) Filed: Oct. 10, 2017

(65) Prior Publication Data

US 2018/0117992 A1 May 3, 2018

(30) Foreign Application Priority Data

Oct. 27, 2016 (DE) .......................... 102016221169.2

(51) Int. Cl.

| | |
|---|---|
| *B60H 1/00* | (2006.01) |
| *B60H 1/06* | (2006.01) |
| *B60H 1/04* | (2006.01) |
| *F01P 11/18* | (2006.01) |
| *F01P 11/16* | (2006.01) |

(52) U.S. Cl.
CPC ..... *B60H 1/00978* (2013.01); *B60H 1/00328* (2013.01); *B60H 1/00885* (2013.01); *B60H 1/04* (2013.01); *B60H 1/06* (2013.01); *F01P 11/16* (2013.01); *F01P 11/18* (2013.01); *F01P 2025/34* (2013.01); *F01P 2025/52* (2013.01)

(58) Field of Classification Search
CPC .. B60H 1/00978; B60H 1/06; B60H 1/00885; B60H 1/00328; B60H 1/00735; B60H 1/00792; B60H 1/04; F01P 11/16; G01K 2201/02
USPC ............ 237/34, 5, 28, 8 A, 8 D, 2 A, 12.3 B
See application file for complete search history.

(56) References Cited

U.S. PATENT DOCUMENTS

| | | | | |
|---|---|---|---|---|
| 3,703,086 A | * | 11/1972 | Nijo ........................ | G05D 23/24 62/209 |
| 3,840,178 A | * | 10/1974 | Kanemoto ........... | G05D 23/185 236/86 |
| 4,184,633 A | * | 1/1980 | Bata .................... | B60H 1/00835 236/68 R |

(Continued)

FOREIGN PATENT DOCUMENTS

| | | | |
|---|---|---|---|
| JP | 08275869 A | * 10/1996 | |
| WO | WO-01/27449 A1 | * 4/2001 | ............. F01P 11/16 |

*Primary Examiner* — Kenneth J Hansen
*Assistant Examiner* — Phillip Decker
(74) *Attorney, Agent, or Firm* — David Coppiellie; King & Schickli, PLLC

(57) ABSTRACT

A vehicle air-conditioning system and a method for operating that vehicle air-conditioning system in dependence on the difference between the temperature of the engine coolant at the inlet into the heating heat exchanger and the temperature of the air at the outlet out of the heating heat exchanger are provided. The measured or estimated temperatures of the coolant at the inlet into the heating heat exchanger and of the air at the outlet out of the heating heat exchanger are checked to determine whether their values indicate fault states of components of the air-conditioning system.

15 Claims, 2 Drawing Sheets

(56) References Cited

U.S. PATENT DOCUMENTS

| | | | | |
|---|---|---|---|---|
| 4,770,000 A * | 9/1988 | Kuroda | ............... | F25B 13/00 62/156 |
| 5,044,430 A * | 9/1991 | Avrea | ............... | F01P 11/02 123/41.51 |
| 5,381,762 A * | 1/1995 | Evans | ............... | F01M 11/02 123/41.29 |
| 5,427,313 A * | 6/1995 | Davis, Jr. | ............... | B60H 1/00814 236/49.3 |
| 5,430,432 A * | 7/1995 | Camhi | ............... | G07C 5/0825 180/171 |
| 5,440,486 A * | 8/1995 | Rudzewicz | ............... | B60H 1/00735 165/42 |
| 6,041,608 A * | 3/2000 | Fujiwara | ............... | F25B 9/00 62/229 |
| 6,374,780 B1 * | 4/2002 | Rutyna | ............... | F01P 7/048 123/41.12 |
| 6,467,282 B1 * | 10/2002 | French | ............... | F25D 21/006 62/140 |
| 6,650,949 B1 * | 11/2003 | Fera | ............... | G05B 23/0262 700/79 |
| 6,678,628 B2 * | 1/2004 | Ryan | ............... | G01K 17/12 374/45 |
| 7,111,506 B2 * | 9/2006 | Tsukamoto | ............... | F01P 11/14 73/114.68 |
| 7,162,358 B2 * | 1/2007 | Gerum | ............... | B60H 1/00978 701/106 |
| 7,184,878 B2 * | 2/2007 | Malone | ............... | F02D 41/22 123/479 |
| 7,363,804 B2 * | 4/2008 | Wakahara | ............... | F01P 11/14 374/E15.001 |
| 7,735,744 B2 * | 6/2010 | Eisenhour | ............... | B60H 1/0073 237/12.3 B |
| 8,100,167 B2 * | 1/2012 | Thybo | ............... | F25B 49/005 165/11.1 |
| 8,224,561 B2 * | 7/2012 | Kim | ............... | G07C 5/004 701/123 |
| 8,540,166 B2 * | 9/2013 | Nemoto | ............... | B60H 1/00764 237/12.3 A |
| 8,573,163 B2 * | 11/2013 | Kinomura | ............... | F01P 11/16 123/41.08 |
| 8,831,922 B2 * | 9/2014 | Sakakibara | ............... | G07C 5/0816 703/8 |
| 8,903,637 B2 * | 12/2014 | Lee | ............... | G07C 5/085 701/123 |
| 9,135,759 B2 * | 9/2015 | Baer | ............... | G07C 5/08 |
| 9,150,132 B2 * | 10/2015 | Hoke | ............... | B60H 1/00849 |
| 9,188,053 B2 * | 11/2015 | Abihana | ............... | F01P 7/164 |
| 9,403,416 B2 * | 8/2016 | Honig | ............... | F25B 49/005 |
| 9,469,291 B2 * | 10/2016 | Okamoto | ............... | B60H 1/00899 |
| 9,493,054 B2 * | 11/2016 | Lewis | ............... | B60H 1/2209 |
| 10,494,984 B2 * | 12/2019 | Bonkoski | ............... | F01P 11/16 |
| 10,549,605 B2 * | 2/2020 | Djermester | ............... | B60H 1/03 |
| 10,618,380 B2 * | 4/2020 | Jentz | ............... | F01N 5/02 |
| 2002/0040280 A1 * | 4/2002 | Morgan | ............... | B60H 1/00978 702/114 |
| 2004/0011068 A1 * | 1/2004 | Hatakeyama | ............... | B60H 1/00849 62/228.1 |
| 2005/0193747 A1 * | 9/2005 | Kajimoto | ............... | B60H 1/322 62/133 |
| 2006/0157576 A1 | 7/2006 | Eisenhour | | |
| 2006/0196634 A1 * | 9/2006 | Sato | ............... | B60H 1/00885 165/41 |
| 2009/0105927 A1 * | 4/2009 | Arai | ............... | B60H 1/00978 701/102 |
| 2012/0318880 A1 * | 12/2012 | Hashigaya | ............... | B60H 1/00792 236/94 |
| 2013/0103284 A1 * | 4/2013 | Gordon | ............... | G01F 23/0076 701/101 |
| 2014/0034401 A1 * | 2/2014 | Cardoso | ............... | H01M 10/6563 180/65.21 |
| 2015/0066263 A1 * | 3/2015 | Abihana | ............... | F01P 7/164 701/22 |
| 2016/0075213 A1 * | 3/2016 | Sugimura | ............... | B60H 1/00899 62/324.1 |
| 2016/0230644 A1 * | 8/2016 | Dudar | ............... | F01P 11/16 |
| 2017/0217286 A1 * | 8/2017 | Tsukamoto | ............... | B60H 1/00978 |

* cited by examiner

VEHICLE AIR-CONDITIONING SYSTEM AND METHOD OF OPERATION

TECHNICAL FIELD

This document relates generally to a method for operating a vehicle air-conditioning system in dependence on the difference between the temperature of the engine coolant at the inlet into the heating heat exchanger and the temperature of the air at the outlet out of the heating heat exchanger.

BACKGROUND

The regulation of vehicle air-conditioning systems uses certain vehicle parameters in order to regulate the fan speed and air distribution. One relevant parameter for the setting of the heating power, and thus the fan speed and air distribution, is the engine coolant temperature.

Modern-day, high-efficiency internal combustion engines have control valves for the engine coolant which are arranged and regulated in a complex manner. Said valves regulate the coolant flow in such a way that, in many situations, not enough heat is supplied to the heating heat exchanger as long as the engine coolant temperature is below a certain value.

If the engine coolant temperature is used as a control signal for the fan speed and air distribution, the result in many situations is an intense fan speed and air distribution without the heating heat exchanger providing a corresponding heat quantity, and so the air flowing into the passenger compartment is perceived by the passengers as being unpleasantly cold and intense.

US 2006/0157576 A1 offers a solution to this problem in the form of a generic method in which the coolant mass flow through the heating heat exchanger of a vehicle air-conditioning system is regulated in dependence on the difference between the temperature of the coolant at the inlet into the heating heat exchanger and the temperature of the air at the outlet out of the heating heat exchanger.

Regulation of the temperature in the interior of the vehicle is possible by measuring the temperature of the coolant mass flow at the inlet into the heating heat exchanger and of the temperature of the air at the outlet out of the heating heat exchanger. Alternatively, the difference between the temperatures of the coolant at the inlet into the heating heat exchanger and of the air at the outlet out of the heating heat exchanger may be determined via stored values for the characteristic of the heat exchange of the heating heat exchanger in dependence on other measurement values.

SUMMARY

It is an object to make a vehicle air-conditioning system of the known type even more reliable and more effective.

Said object is achieved by a method and an air-conditioning system having the features described herein.

Accordingly, the measured or estimated temperatures of the coolant at the inlet into the heating heat exchanger and of the air at the outlet out of the heating heat exchanger are checked to determine whether their values indicate fault states of components of the air-conditioning system.

If any fault state is detected, the driver may be prompted to look sooner or later for a workshop, and until then the operation of the air-conditioning system can possibly be modified in such a way that the air-conditioning system is still effective to an adequate extent without there being any risk of it sustaining further damage.

In particular, the measured or estimated temperatures may be checked to determine whether their values indicate malfunctioning of a closing valve of the heating heat exchanger, malfunctioning of a mixing flap of the air-conditioning system, the presence of a low coolant level or of gas bubbles in the heating heat exchanger and/or an incorrect concentration of antifrost agent in the coolant.

The temperature of the air at the outlet out of the heating heat exchanger may be either determined by direct measurement or estimated on the basis of the measured temperature of cooling fins 24 at the outlet 22 of the heating heat exchanger 18.

In a further refinement of the method and system, in the case of a request for maximum heating power or in defroster operation, not the coolant mass flow, as in the abovementioned US 2006/0157576 A1, but the air quantity flowing through the heating heat exchanger is regulated in dependence on the difference between the temperature of the engine coolant at the inlet into the heating heat exchanger and the temperature of the air at the outlet out of the heating heat exchanger. This may be done in such a way that the heating of the vehicle cabin and, if appropriate, of some vehicle drive components, such as for example an internal combustion engine and/or traction current batteries, is promoted.

Although limited air quantity regulation for comfortable heating of the passenger compartment is already known per se, it has hitherto not been realized for the case of heating when maximum heating power is requested or during defroster operation. A limitation of the air quantity to approx. 70 to 80% of the maximum air quantity is known, the former being constant and independent of the coolant temperature, however. The inventors have determined that, for maximum heating power and defroster operation, a variable air quantity has a positive influence, in particular that air quantity regulation in dependence on the difference between the engine coolant temperature and the air blowing-out temperature allows even quicker heating than in the case of a limitation of the maximum air quantity to 80%.

In the case of a relatively low air throughput, firstly the blowing-out temperature of the air into the interior of the vehicle rises, and secondly the residence time of the air in the interior of the vehicle is longer, and therefore more heat is discharged to the interior before the air exits the interior again.

Thus, air quantity regulation that is limited in a temperature-dependent manner is useful even without checking its values for fault states of components of the air-conditioning system.

The air quantity flowing through the heating heat exchanger can be regulated in a simple manner by means of the rotational speed of the fan motor, in particular by means of the voltage supplied to the fan motor.

In a preferred embodiment, the air quantity is regulated in accordance with a preset dependence of the air quantity flowing into the heating heat exchanger on the current temperature of the engine coolant.

Preferably, the air quantity is regulated in such a way that at engine coolant temperatures in the region around 0° C. it is approximately 40 to 60% of the maximum air quantity and increases approximately linearly with rising engine coolant temperature until at engine coolant temperatures of 50 or 60° C. it is in the region of approximately 80% of the maximum air quantity and at even higher engine coolant temperature remains at this value.

Alternatively, it is possible to regulate the air quantity in such a way that the difference between the temperature of the engine coolant at the inlet into the heating heat exchanger and the temperature of the air at the outlet out of the heating heat exchanger is not greater than a preset value which may be for example 2° K.

Stated another way, a vehicle air conditioning system includes a first sensor to monitor a first temperature of an engine coolant at an inlet to a heating heat exchanger, a second sensor to monitor a second temperature of air at an air outlet of the heating heat exchanger and a controller configured or adapted to compare the first and second temperatures to determine whether a fault state of a component of the vehicle air conditioning system is indicated.

Thus, a method of operating a vehicle air-conditioning system comprises: (a) determining a first temperature of an engine coolant at an inlet to a heating heat exchanger, (b) determining a second temperature of air at an outlet of said heating heat exchanger, and (c) comparing or checking the first and second temperatures to determine whether the first and second temperatures indicate a fault state of a component of the vehicle air-conditioning system.

Thus, more particularly, the method may include checking the first and second temperatures to determine and indicate any or all of the following:
(1) whether a closing valve of the heating heat exchanger is malfunctioning;
(2) whether a mixing flap of the heating heat exchanger is malfunctioning;
(3) whether the engine coolant level is low;
(4) whether gas bubbles are in the engine coolant in the heating heat exchanger;
(5) whether the engine coolant includes an incorrect concentration of antifrost/antifreeze agent.

The method may also include the step of comparing the first and second temperatures to determine a difference between a first temperature and the second temperature. Further, the method may include the step of directly measuring the first temperature with a first sensor. The method may also include the step of directly measuring the second temperature with a second sensor. In other embodiments, the method may include the step of estimating the second temperature on the basis of measuring the temperature of the cooling fins of the heating heat exchanger.

Still further, the method may include the step of regulating the quantity of the air flowing through the heating heat exchanger in dependence upon the difference between the first and second temperatures. In addition, the method may include the step of regulating the quantity of the air flowing into the heating heat exchanger in accordance with a preset dependence based upon a temperature of the engine coolant.

In some embodiments, the method may include the step of regulating the quantity of the air flowing through the heating heat exchanger so that when the engine coolant temperature is about 0° C. approximately 40-60% of the maximum air quantity is circulated through the heating heat exchanger. Further, the method may include increasing the quantity of air flowing through the heating heat exchanger substantially linearly with rising engine temperature until at an engine coolant temperature of between about 50-60° C. approximately 80% of the maximum air quantity is circulated through the heating heat exchanger.

In some embodiments, the method may include the step of using evaluation results to calculate and indicate to a driver of a motor vehicle a potential improvement with regard to fuel consumption or range that is achievable with a given fuel quantity.

BRIEF DESCRIPTION OF THE DRAWING FIGURES

Exemplary embodiments will be described below on the basis of the drawings. In the drawings.

DETAILED DESCRIPTION

The air quantity flowing through the heating heat exchanger, also referred to below as air volume flow, is generally proportional to the voltage applied to the fan, which is at most slightly smaller than the maximum available voltage in the vehicle. For example, in an on-board power system of 12.8 volts, the voltage supplied to the fan can be a maximum of 12 volts.

Figure 3:
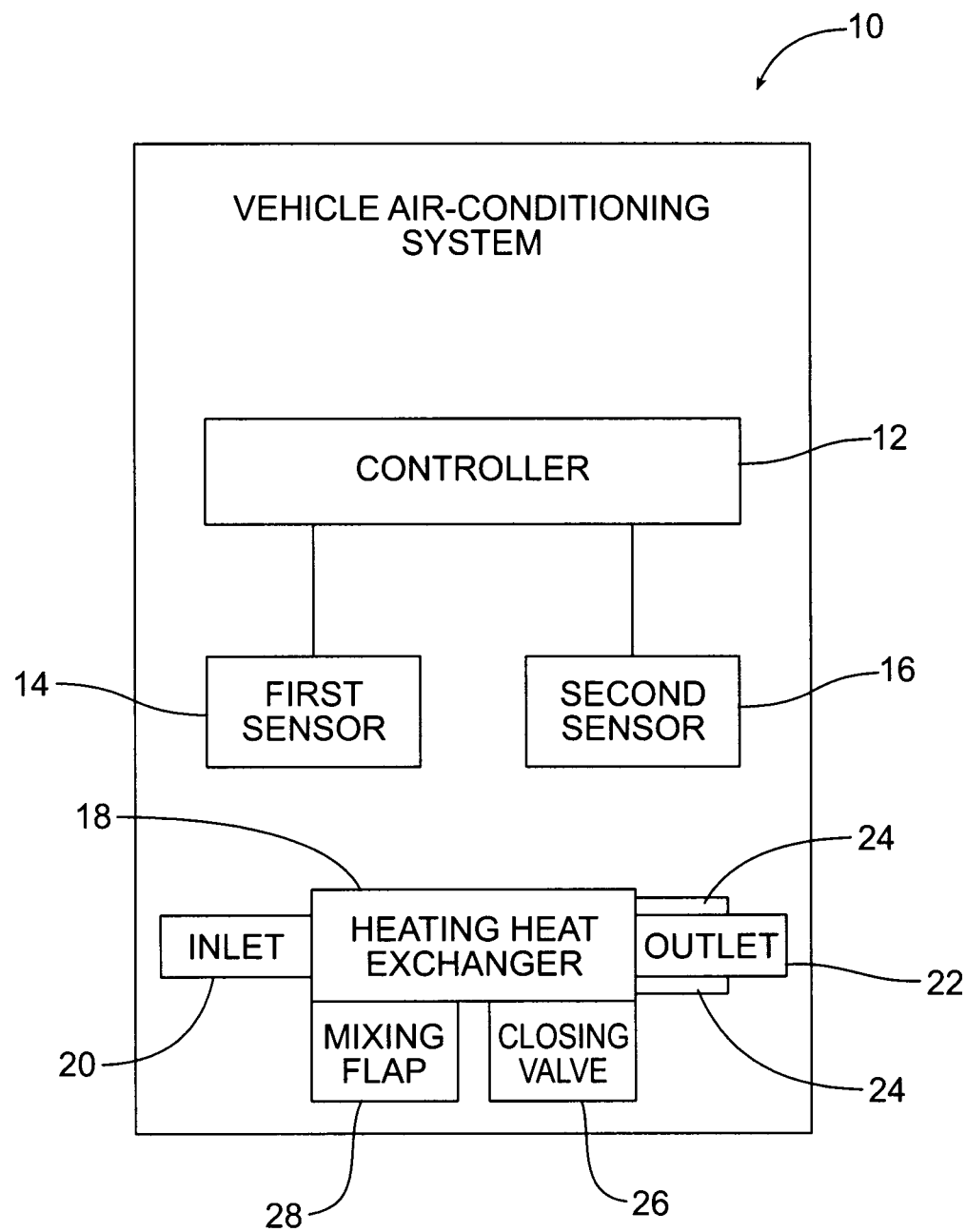
FIG. 3 schematically illustrates the vehicle air conditioning system.

A vehicle air-conditioning system 10 is schematically illustrated in FIG. 3. That vehicle air conditioning system 10 includes a controller 12, in the form of a computing device, a first sensor 14 for monitoring a first temperature of an engine coolant at an inlet 20 to a heating heat exchanger 18 and a second sensor 16 for monitoring a second temperature of air at an outlet 22 of the heating heat exchanger.

In the case of a request for maximum heating power or in defroster operating mode the air volume flow is regulated by the controller 12 of this air conditioning system 10 in a temperature-dependent manner as follows.

Figure 1:
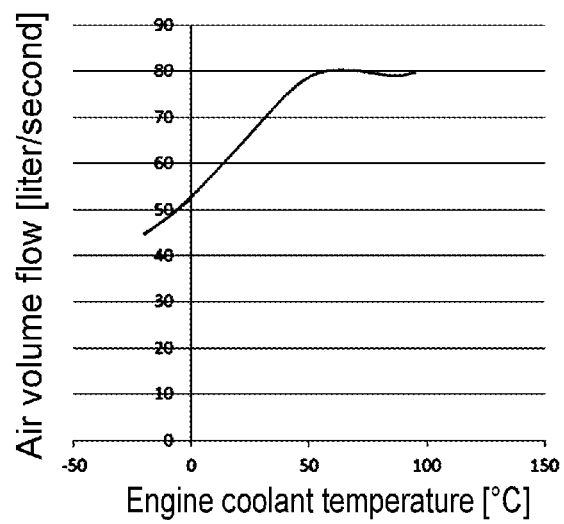
FIG. 1 shows an example of a profile of the air volume flow in dependence on the current engine coolant temperature.

As shown in the graphs of FIG. 1, at engine coolant temperatures around zero ° C. the air volume flow is limited to approximately 50% and increases approximately linearly with rising engine coolant temperature until, at engine coolant temperatures of 50° C. and higher, it is approx. 80% of the maximum value.

Figure 2:
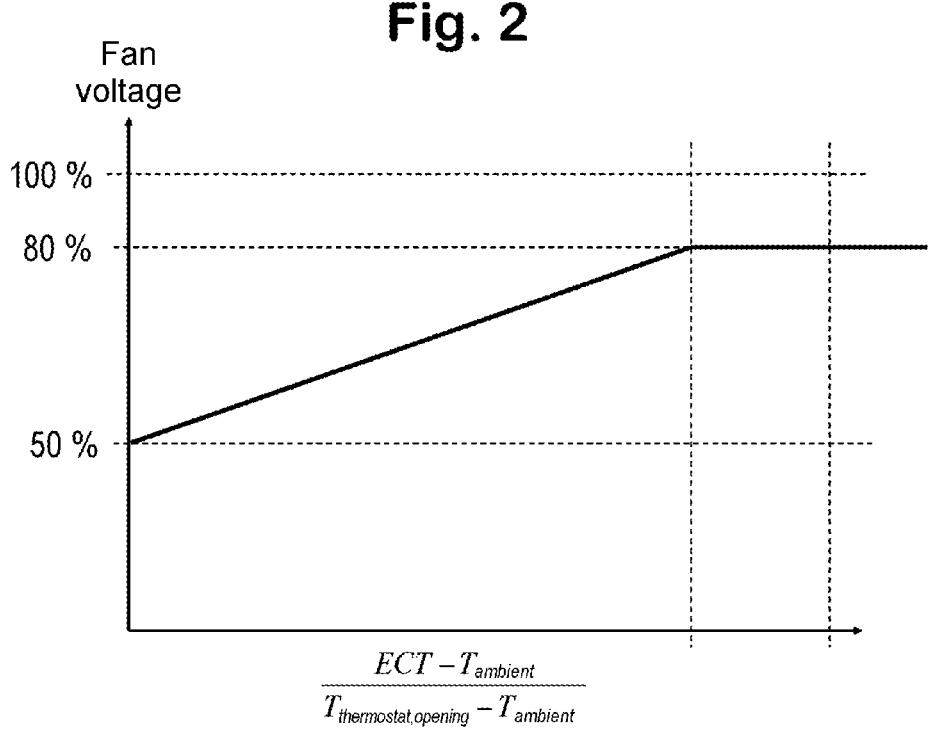
FIG. 2 shows an example of a profile of the fan voltage in dependence on the current engine coolant temperature (ECT) and on other variables.

The air volume flow is expediently regulated by correspondingly setting fan voltage, as shown in the graph of FIG. 2, and specifically in the dependence, specified on the abscissa, on the current engine coolant temperature (ECT), the ambient temperature ($T_{ambient}$), and the opening temperature of the thermostat ($T_{thermostat,opening}$). Here, the minimum fan voltage is a fixedly predefined value, in this example 50% of the on-board power system voltage, which value permits a noise level of the fan, that is still perceivable, as an acoustic confirmation of correct functioning. The maximum fan voltage here should be approx. 80% of the on-board power system voltage. If the engine coolant temperature and thus the blowing-out temperature of the air-conditioning system reaches or exceeds a limit value, the air volume flow is limited to a corresponding maximum value.

The dependence, shown in FIG. 2, of the air volume flow on the coolant temperature may be stored, for example in the form of a lookup table, by the software of the air-conditioning system.

Table 1, which is reproduced below, shows calculated heating of the passenger compartment of a certain motor vehicle type having an air-conditioning system whose fan voltage is the function, shown in FIG. 2, of the current coolant temperature.

TABLE 1

| | | Constant fan voltage = 80% of the maximum value | | Fan voltage as f (ECT) | |
|---|---|---|---|---|---|
| | | Blowing-out temperature | Average interior temperature | Blowing-out temperature | Average interior temperature |
| Starting conditions Idle state | °C. | −18.0 | −18.0 | −18.0 | −18.0 |
| after 5 min | °C. | 12.7 | −5.7 | 21.9 | −4.7 |
| after 10 min 50 km/h phase | °C. | 20.4 | 0.4 | 31.8 | 1.9 |
| after 5 min | °C. | 36.2 | 8.3 | 43.6 | 9.2 |
| after 10 min | °C. | 41.7 | 14.1 | 50.1 | 15.3 |
| after 15 min | °C. | 44.6 | 18.1 | 47.3 | 19.1 |
| after 20 min | °C. | 45.7 | 20.9 | 47.4 | 21.6 |
| after 25 min | °C. | 46.1 | 22.9 | 47.3 | 23.5 |
| after 30 min 100 km/h phase | °C. | 46.7 | 24.4 | 47.5 | 25.0 |
| after 10 min Idle state | °C. | 66.9 | 39.1 | 67.0 | 39.1 |
| after 10 min | °C. | 44.5 | 31.6 | 44.3 | 33.6 |

The times specified in table 1 relate to a standard test procedure of the applicant. The vehicle is firstly cooled to −18° C. in this case. Following the start of the engine, the vehicle runs firstly for 10 minutes in the idle state, then for 30 minutes at a constant 50 km/h, then for 10 minutes at a constant 100 km/h, and then for 10 minutes in the idle state again.

As can be seen from table 1, the vehicle cabin can be heated up significantly more quickly in the case of temperature-dependent regulation of the fan voltage than at a constant fan voltage.

Alternatively, the air volume flow is regulated in such a way that the difference between the temperature of the coolant into the heating heat exchanger 18 and the temperature of the air flowing out of the heating heat exchanger is not greater than a predefined value which may be for example 2° K. In this way too, the vehicle cabin can be heated up significantly more quickly.

Thus, only the air volume flow is regulated and not the coolant mass flow which flows through the heating heat exchanger 18 of the air-conditioning system 10 and depends on parameters other than the air volume flow. In the internal combustion engine, the air volume flow is obtained substantially by the rotational speed of the engine and the function of the thermostat.

In battery electric vehicles and hybrid electric vehicles, in which the method described is likewise applicable, the heating heat exchanger 18 being thermally connected to the traction current batteries and to the power electronics, the air volume flow is determined substantially by the current temperatures of the traction current batteries and of the power electronics.

The methods described may also be advantageously carried out with the inclusion of a positive temperature coefficient (PTC) supplementary heating element upstream or downstream of the heating heat exchanger 18. Such a PTC supplementary heating element is often available in battery electric vehicles and hybrid electric vehicles, but may also be available in vehicles operated purely by internal combustion engines.

The described air quantity regulation which is limited in a temperature-dependent manner is advantageous in particular for the following reasons. In the case of low coolant temperatures at the inlet 20 into the heating heat exchanger 18, only a very small part of the heating heat exchanger is used for heat transfer in the case of a large air quantity since the coolant is already substantially cooled down just after entering the heating heat exchanger. An ideal heat exchange would be realized if the temperature of the coolant were to reach ambient temperature just before exiting the heating heat exchanger 18. In other words, when there is a small difference between the inlet-air temperature and the inlet-coolant temperature at the heating heat exchanger 18, the air quantity could be very small (as far as zero) and increases with rising coolant temperature. However, too small an air quantity can lead to condensation in the vehicle, and so a minimum air quantity is necessary at all times for preventing or eliminating condensation, for which quantity a value of 50% of the maximum air quantity has been assumed here, this, however, depending on the design of the vehicle, of the air-guiding channels and of the air-conditioning system.

Without the air quantity limitation described or with a limitation, known per se, to 80% of the maximum air quantity, when there is a relatively high air throughput the blowing-out temperature of the air would drop, and the air would flow more quickly through the interior and also quickly exit it again.

By contrast, in the case of relatively low air throughput the blowing-out temperature of the air into the interior of the vehicle rises. As a result, the residence time of the air in the interior of the vehicle is also longer, and therefore more heat can be discharged to the interior before the air exits the interior again through extractors.

On account of measurement and adjustment of the inlet-air temperature and the in-let-coolant temperature into the heating heat exchanger 18, the following diagnoses can be made:

Correct functioning or malfunctioning of the closing valve 26 of the heating heat exchanger Correct functioning or malfunctioning of a mixing flap 28 of the air-conditioning system in relation to the inlet-air temperature Identification of a low coolant level or of gas bubbles in the heating heat exchanger Identification of the concentration of antifrost agent in the coolant Anomalous temperatures or temperature differences indicate fault states of components of the air-conditioning system 10, and different fault states can also be distinguished from one another, in particular as follows:

Malfunctioning of the Closing Valve of the Heating Heat Exchanger:

The temperature of the coolant rises, the blowing-out-temperature sensors for the air out of the air-conditioning system show a rise, the temperature sensor at the inlet 20 into the heating heat exchanger 18, however, shows no rise.

Malfunctioning of a Mixing Flap in Relation to Blowing-Out-Temperature Sensor(s):

The temperature of the coolant rises, the blowing-out-temperature sensors for the air out of the air-conditioning system show no rise, the temperature sensor at the inlet 20 into the heating heat exchanger 18, however, shows a rise.

Identification of a Low Coolant Level or of Gas Bubbles or

Identification of the Concentration of Antifrost Agent in the Coolant:

In the heating heat exchanger 18 of the air-conditioning system 10, the coolant heats up the air which flows into the interior of the vehicle. The exchange of heat can be described by an equation which contains only parameters which are able to be measured, calculated, or stored electronically by way of a characteristic map. It is possible to calculate from the individual values a value cps which ideally is equal to a defined thermal capacity $c_{pc,ref}$ (reference thermal capacity) of the coolant. The formula relationship is in this case as follows:

$$\text{Fault value }[\%] = \frac{c_{pc}}{c_{pc,ref}} = \frac{c_{pA} \cdot M_a \cdot (T_{A0} - T_{Ai})}{c_{pc,ref} \cdot M_c \cdot (T_{ci} - T_{co}) \cdot \varphi}$$

Here:

$c_{pA}$ is the thermal capacity of the air as f (T, φ, p)

$M_a$ is the air mass flow as f (fan stage, vehicle speed, operating mode of the air-conditioning system, etc.)

$T_{Ai}$ is the temperature of the air at the inlet 20 into the heating heat exchanger 18 measurement value (evaporator temperature sensor)

$T_{A0}$ is the temperature of the air at the outlet 22 out of the heating heat exchanger 18-->measurement value by means of new sensor (alternatively: measurement value of the blowing-out temperature sensors)

$c_{pc,ref}$ is the reference thermal capacity of the coolant $M_c$ is the coolant mass flow, known as f (engine rotational speed, thermostat control, voltage, etc.)

$T_{ci}$ is the temperature of the coolant at the inlet 20 into the heating heat exchanger 18 is equal to the coolant temperature in the engine, which temperature is available as a measurement value $T_{co}$ is the temperature of the coolant at the outlet 22 out of the heating heat exchanger 18-->is known from component tests (dependent on air mass flow, $T_{ci}$, $T_{Ai}$, . . . )

φ is the degree of exchange of the heat exchanger. Is determined in component tests. Can also be determined jointly with $T_{co}$ (in which case φ=1)

The fault value is assigned here, for example, the following fault codes:

| Fault value | Fault code |
|---|---|
| 1 . . . 0.9 | No fault |
| 0.9 . . . 0.7 | Insufficient coolant frost protection |
| 0.7 . . . 0.2 | Air in the coolant circuit |
| 0.2 . . . 0 | Critical coolant loss |

What is claimed:

1. A method of operating a vehicle air-conditioning system, comprising:
determining a first temperature of an engine coolant at an inlet to a heating heat exchanger;
determining a second temperature of air at an outlet of said heating heat exchanger; comparing said first temperature and said second temperature to determine whether said first temperature and said second temperature indicate a fault state of a component of said vehicle air-conditioning system; and
checking said first temperature and said second temperature to determine whether said first temperature and said second temperature indicate presence of gas bubbles in the heating heat exchanger.

2. The method of claim 1, including checking said first temperature and said second temperature to determine whether said first temperature and said second temperature indicate malfunctioning of a closing valve of said heating heat exchanger.

3. The method of claim 1, including checking said first temperature and said second temperature to determine whether said first temperature and said second temperature indicate malfunctioning of a mixing flap of the vehicle air-conditioning system.

4. The method of claim 1, including checking said first temperature and said second temperature to determine whether said first temperature and said second temperature indicate presence of a low engine coolant level.

5. The method of claim 1, including checking said first temperature and said second temperature to determine whether said first temperature and said second temperature indicate incorrect concentration of antifrost agent in the engine coolant.

6. The method of claim 1, including comparing said first temperature to said second temperature to determine a difference between said first temperature and said second temperature.

7. The method of claim 1, including directly measuring said first temperature with a first sensor in order to determine said first temperature.

8. The method of claim 7, including directly measuring said second temperature with a second sensor in order to determine said second temperature.

9. The method of claim 7, including estimating said second temperature on a basis of measuring temperature of cooling fins of the heating heat exchanger.

10. The method of claim 1, further including regulating a quantity of said air flowing through said heating heat exchanger in dependence on difference between said first temperature and said second temperature.

11. The method of claim 1, further including regulating a quantity of said air flowing into said heating heat exchanger in accordance with a preset dependence based upon a temperature of said engine coolant.

12. The method of claim 1, further including regulating a quantity of said air flowing through said heating heat exchanger so that when said temperature of said engine coolant is 0° C. 40-60% of a maximum air quantity based upon fan voltage is circulated through said heating heat exchanger.

13. The method of claim 12, further including increasing said quantity of said air flowing through said heating heat exchanger substantially linearly with rising engine temperature until at an engine coolant temperature of 50-60° C. 80% of the maximum air quantity based upon fan voltage is circulated through said heating heat exchanger.

14. A vehicle air-conditioning system, comprising:
a first sensor for monitoring a first temperature of an engine coolant at an inlet into a heating heat exchanger;
a second sensor for monitoring a second temperature of air at an outlet out of said heating heat exchanger or an air outlet region of said heating heat exchanger; and
a controller adapted to compare said first temperature and said second temperature to determine whether a fault state of a component of said vehicle air-conditioning system is indicated, the fault state comprising (a) gas bubbles are present in the heating heat exchanger or (b) an incorrect concentration of antifrost agent is in engine coolant.

15. A method of operating a vehicle air-conditioning system, comprising:
determining a first temperature of an engine coolant at an inlet to a heating heat exchanger;

determining a second temperature of air at an outlet of said heating heat exchanger;

comparing said first temperature and said second temperature to determine whether said first temperature and said second temperature indicate a fault state of a component of said vehicle air-conditioning system; and checking said first temperature and said second temperature to determine whether said first temperature and said second temperature indicate incorrect concentration of antifrost agent in the engine coolant.

* * * * *